US010458348B2

(12) United States Patent
Kimura et al.

(10) Patent No.: US 10,458,348 B2
(45) Date of Patent: Oct. 29, 2019

(54) CONTROL APPARATUS FOR AN INTERNAL COMBUSTION ENGINE

(71) Applicant: TOYOTA JIDOSHA KABUSHIKI KAISHA, Toyota-shi, Aichi-ken (JP)

(72) Inventors: Koichi Kimura, Numazu (JP);
Norihisa Nakagawa, Susono (JP);
Takanobu Hosoya, Gotenba (JP);
Takuya Okubo, Fuji (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 261 days.

(21) Appl. No.: 15/358,242

(22) Filed: Nov. 22, 2016

(65) Prior Publication Data
US 2017/0145936 A1    May 25, 2017

(30) Foreign Application Priority Data
Nov. 24, 2015    (JP) ................................ 2015-228827

(51) Int. Cl.
*F02D 41/02* (2006.01)
*F01N 13/00* (2010.01)
(Continued)

(52) U.S. Cl.
CPC ............ *F02D 41/024* (2013.01); *F01N 3/20* (2013.01); *F01N 9/00* (2013.01); *F01N 13/008* (2013.01);
(Continued)

(58) Field of Classification Search
CPC .. F02D 41/024; F02D 41/0007; F02D 41/123; F02D 41/3005; F02D 2200/0802;
(Continued)

(56) References Cited

U.S. PATENT DOCUMENTS 4,120,156 A * 10/1978 McInerney ........... F02B 37/183
                                                415/144
4,613,288 A *  9/1986 McInerney ............. F01D 17/08
                                                384/107
(Continued)

FOREIGN PATENT DOCUMENTS

JP    2010-180781 A    8/2010
JP    2012-002094 A    1/2012
(Continued)

*Primary Examiner* — John M Zaleskas
*Assistant Examiner* — Susan E Scharpf
(74) *Attorney, Agent, or Firm* — Hunton Andrews Kurth LLP

(57) ABSTRACT

In a control apparatus applied to an internal combustion engine in which when an opening degree of a valve body of a waste gate valve is less than the predetermined opening degree, the extension line intersects a wall surface of an exhaust passage located upstream of the upstream side end face of the exhaust gas purification catalyst, the control apparatus controls the waste gate valve so that at the time of execution of fuel cut off processing, when the temperature of the exhaust gas purification catalyst is less than a predetermined temperature, the valve body is fully closed, whereas when the temperature of the exhaust gas purification catalyst is not less than the predetermined temperature, the opening degree of the valve body is made to a deterioration suppression opening degree which is larger than when the valve body is fully closed and which is smaller than the predetermined opening degree.

2 Claims, 8 Drawing Sheets

(51) Int. Cl.
*F01N 3/20* (2006.01)
*F02D 41/30* (2006.01)
*F02B 37/18* (2006.01)
*F01N 9/00* (2006.01)
*F02D 41/12* (2006.01)
*F02D 41/00* (2006.01)

(52) U.S. Cl.
CPC ........ *F02B 37/183* (2013.01); *F02D 41/0007* (2013.01); *F02D 41/123* (2013.01); *F02D 41/3005* (2013.01); *F01N 2900/1602* (2013.01); *F02D 2200/0802* (2013.01); *Y02T 10/144* (2013.01); *Y02T 10/47* (2013.01)

(58) Field of Classification Search
CPC . F01N 3/20; F01N 9/00; F01N 13/008; F01N 2900/1602; F02B 37/183; Y02T 10/144; Y02T 10/47
USPC ........................................................ 701/104
See application file for complete search history.

(56) References Cited

U.S. PATENT DOCUMENTS

| | | | | |
|---|---|---|---|---|
| 8,607,565 | B2* | 12/2013 | Sato | F02B 37/18 60/602 |
| 2003/0024499 | A1* | 2/2003 | Umezono | F02B 31/085 123/301 |
| 2003/0121495 | A1* | 7/2003 | Abo | F02B 17/005 123/295 |
| 2010/0064686 | A1* | 3/2010 | Mondori | F01N 3/2053 60/605.2 |
| 2010/0187460 | A1* | 7/2010 | An | F02B 37/013 251/301 |
| 2011/0100013 | A1* | 5/2011 | Whitney | F02D 41/0005 60/706 |
| 2011/0126537 | A1* | 6/2011 | Yoshimoto | F01D 17/105 60/614 |
| 2011/0146267 | A1* | 6/2011 | Hepburn | F01N 3/021 60/602 |
| 2012/0060494 | A1* | 3/2012 | Sato | F02B 37/025 60/602 |
| 2012/0137677 | A1* | 6/2012 | Sato | F02B 37/18 60/603 |
| 2012/0240571 | A1* | 9/2012 | Otsuka | F02B 37/18 60/601 |
| 2012/0312010 | A1* | 12/2012 | Yasoshima | F01D 17/105 60/602 |
| 2014/0137552 | A1 | 5/2014 | Yokono et al. | |
| 2015/0040561 | A1* | 2/2015 | Matsui | F01N 3/2006 60/602 |
| 2015/0104300 | A1* | 4/2015 | Yanagida | F02B 37/22 415/204 |

FOREIGN PATENT DOCUMENTS

| | | |
|---|---|---|
| JP | 2014-015846 A | 1/2014 |
| JP | 2014-088867 A | 5/2014 |
| JP | 2014-101862 A | 6/2014 |
| WO | 2012-042609 A1 | 4/2012 |

* cited by examiner

[Fig. 1]
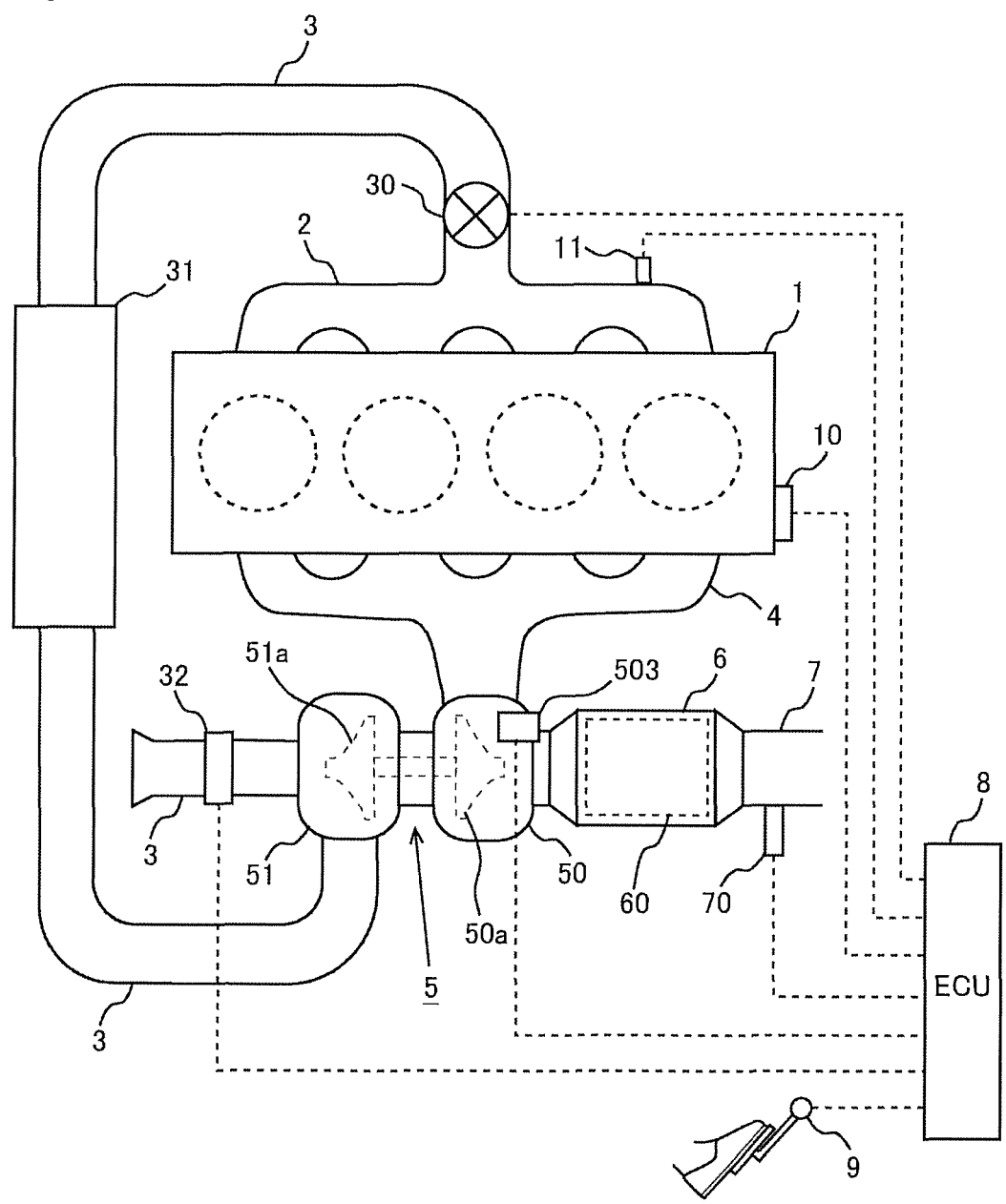

[Fig. 2]
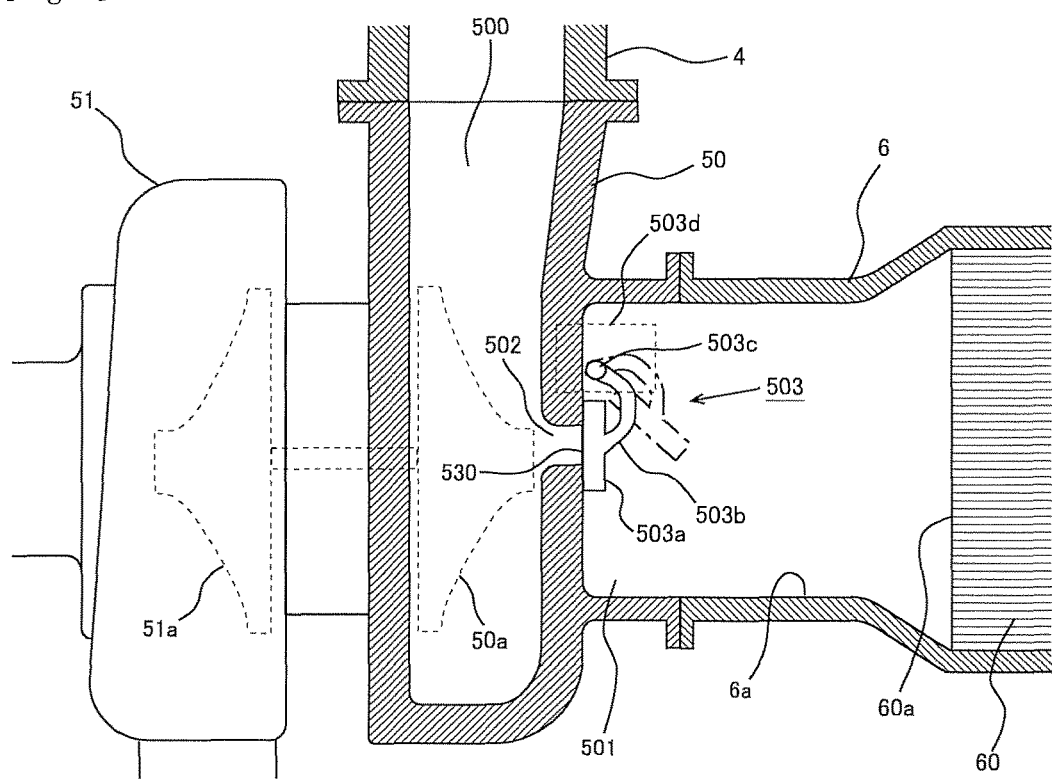

[Fig. 3]
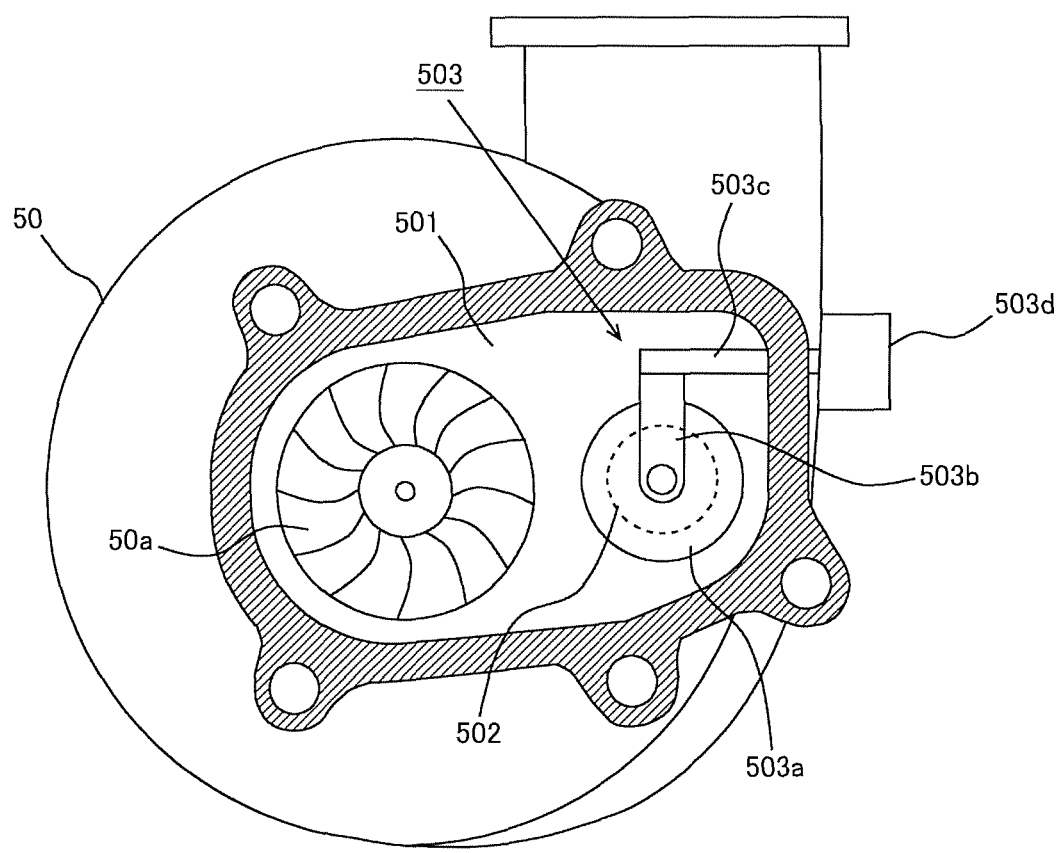

[Fig. 4]
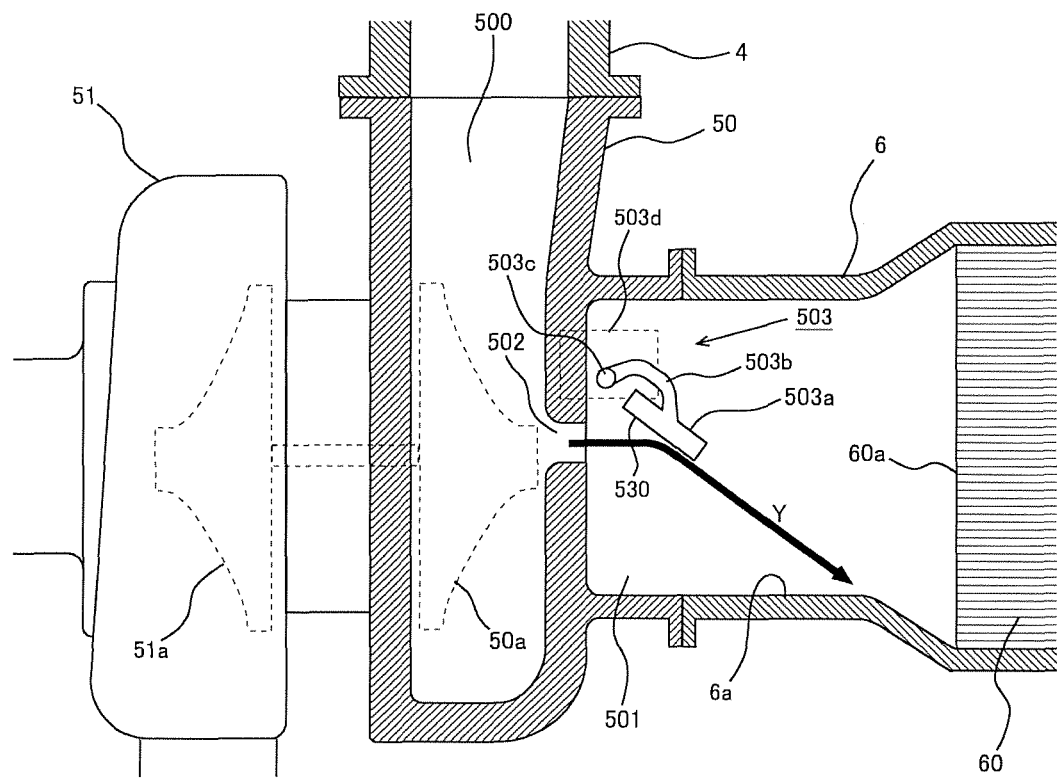

[Fig. 5]
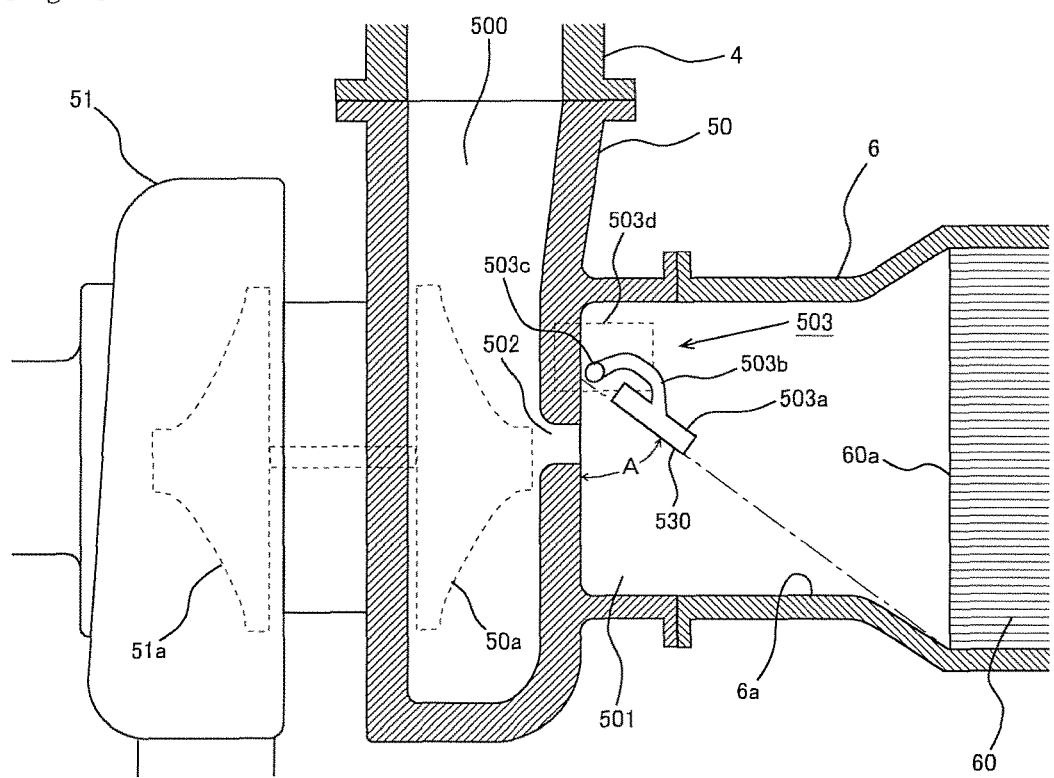

[Fig. 6]
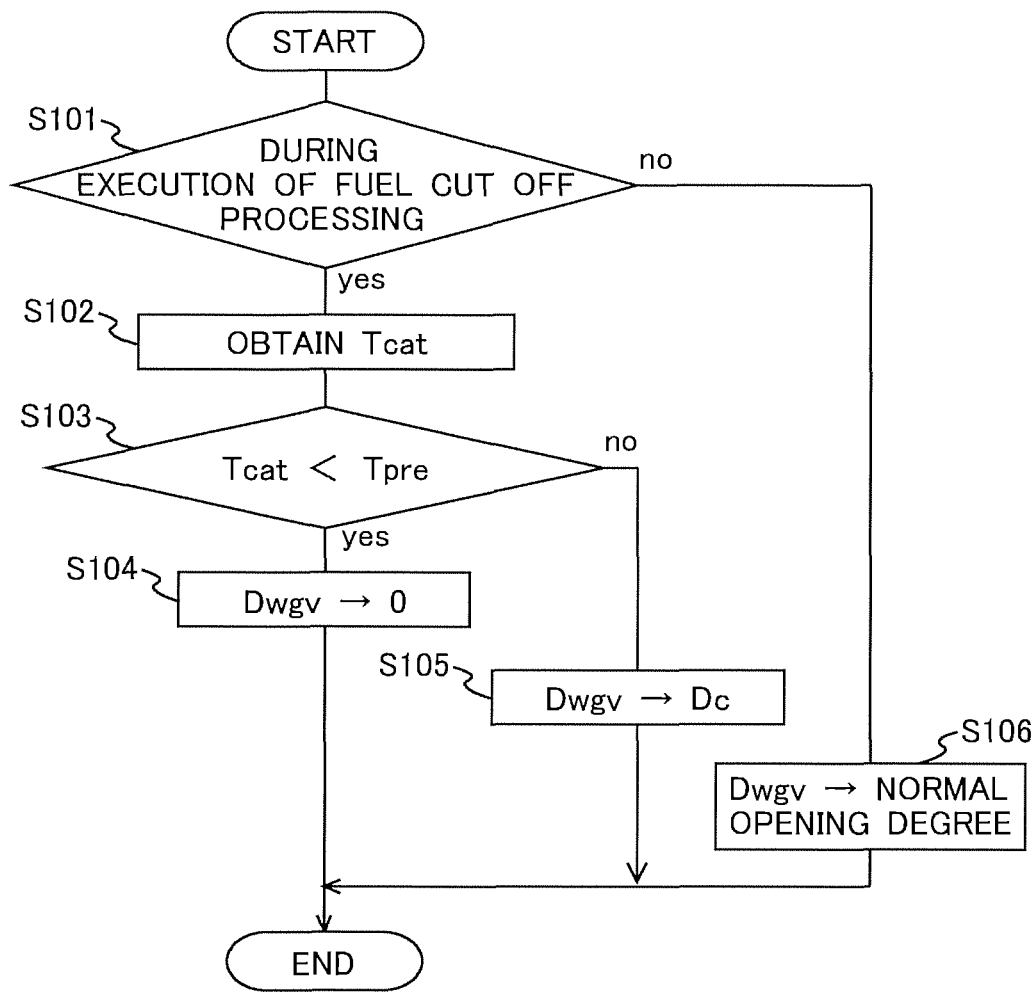

[Fig. 7]
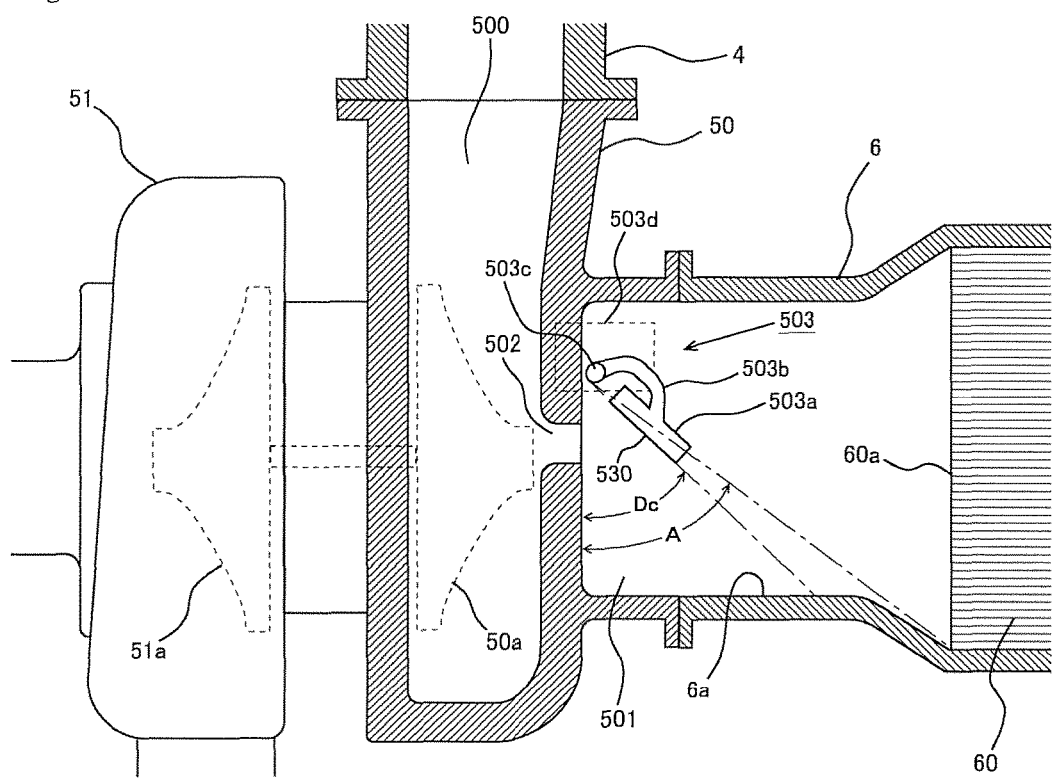

[Fig. 8]
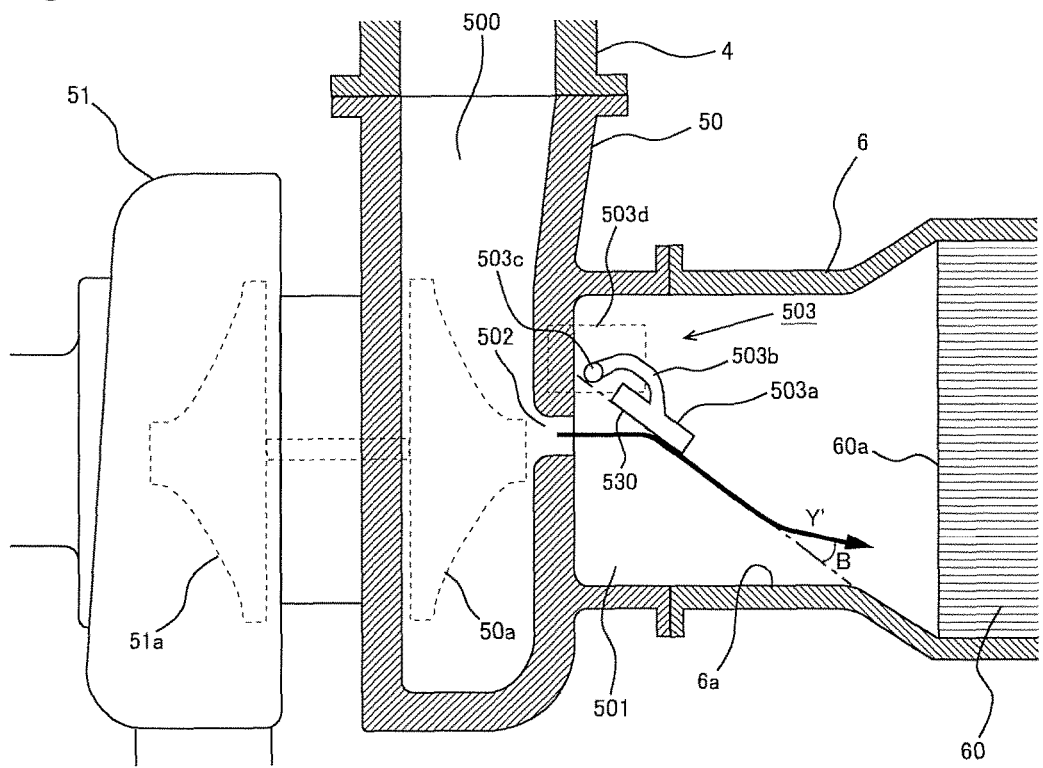

CONTROL APPARATUS FOR AN INTERNAL COMBUSTION ENGINE

BACKGROUND

Technical Field

The present disclosure relates to a control technology which is applied to an internal combustion engine including an exhaust turbine supercharger (turbocharger) for driving a centrifugal type compressor by using exhaust gas energy, and in particular to a technology to control a waste gate valve attached to the turbocharger.

Description of Background Art

As a supercharger applied to an internal combustion engine, there has been known a turbocharger which is provided with a turbine arranged in an exhaust passage, a compressor arranged in an intake passage, a bypass passage for causing exhaust gas to flow therethrough while bypassing the turbine, and a waste gate valve equipped with a valve body for opening and closing the bypass passage.

A first patent literature discloses an arrangement of an internal combustion engine in which an exhaust gas purification catalyst is arranged in an exhaust passage at a location downstream of a turbine of a turbocharger, wherein when the degree of opening of a valve body of a waste gate valve is equal to or larger than a predetermined degree of opening, most of the exhaust gas having flowed out from an outlet of a bypass passage impinges directly against an upstream side end face of the exhaust gas purification catalyst, whereas when the degree of opening of the valve body of the waste gate valve is less than the predetermined degree of opening, most of the exhaust gas having passed through the bypass passage impinges directly against a wall surface of the exhaust passage which is located upstream of the upstream side end face of the exhaust gas purification catalyst. In addition, in the first patent literature, there is also disclosed a method in which in cases where warming of the exhaust gas purification catalyst is required, as when the internal combustion engine is cold started, exhaust gas of high temperature is caused to impinge directly against the exhaust gas purification catalyst, by controlling the degree of opening of the valve body of the waste gate valve to a degree of opening equal to or larger than the predetermined degree of opening. Moreover, in the first patent literature, there is also disclosed a method in which in cases where the temperature of the exhaust gas purification catalyst may rise to an excessive extent, as when the internal combustion engine is operated at a high load, exhaust gas of high temperature is caused not to impinge directly against the exhaust gas purification catalyst, by controlling the degree of opening of the valve body of the waste gate valve to a degree of opening smaller than the predetermined degree of opening.

In a second patent literature, there is disclosed a technology in which when processing to stop combustion of fuel (fuel cut off processing) is carried out by stopping the supply of fuel to an internal combustion engine in the course of the operation of the internal combustion engine, a valve body of a waste gate valve is fully closed.

Patent Literature

First Patent Literature: Japanese patent laid-open publication No. 2010-180781

Second Patent Literature: Japanese patent laid-open publication No. 2014-101862

SUMMARY

However, when the fuel cut off processing of the internal combustion engine is carried out, the air sucked into the internal combustion engine is discharged from the internal combustion engine, without being supplied for combustion. In other words, at the time of the execution of the fuel cut off processing, exhaust gas (air), which is low in temperature and which is in an atmosphere where oxygen is excessive, is discharged from the internal combustion engine. For that reason, there can be considered a method in which in the arrangement where the exhaust gas purification catalyst is arranged in the exhaust passage at a location downstream of the turbine of the turbocharger, in cases where the temperature of the exhaust gas purification catalyst is low, the exhaust gas warmed by the heat of the turbine is supplied to the exhaust gas purification catalyst, by fully closing the valve body of the waste gate valve at the time of the execution of the fuel cut off processing, whereas in cases where the temperature of the exhaust gas purification catalyst is high, the exhaust gas of low temperature having not passed through the turbine is supplied to the exhaust gas purification catalyst, by opening the valve body of the waste gate valve at the time of the execution of the fuel cut off processing.

However, as described in the above-mentioned first patent literature, in an arrangement in which the direction of movement of the exhaust gas flowing out from the bypass passage changes according to the degree of opening of the valve body of the waste gate valve, when the degree of opening of the valve body of the waste gate valve is made more than the predetermined degree of opening at the time of the temperature of the exhaust gas purification catalyst being high and at the same time of the fuel cut off processing being carried out, an amount of exhaust gas impinging directly against a part of the upstream side end face of the exhaust gas purification catalyst, among the exhaust gas of low temperature having passed through the bypass passage, becomes large. At that time, the part of the upstream side end face of the exhaust gas purification catalyst is cooled locally, so that thermal stress may act on the exhaust gas purification catalyst. Moreover, the part of the upstream side end face of the exhaust gas purification catalyst becomes locally oxygen-excessive atmosphere, and so, sintering of a precious metal catalyst supported by the part may occur. Accordingly, when the temperature of the exhaust gas purification catalyst is high and the fuel cut off processing is carried out, if the degree of opening of the valve body of the waste gate valve is made equal to or more than the predetermined degree of opening, the exhaust gas purification catalyst may be deteriorated due to the occurrence of thermal stress or the occurrence of sintering.

Embodiment of the present disclosure has been made in view of the circumstances as referred to above, and its object is to provide a technique which can adjust the temperature of an exhaust gas purification catalyst in a suitable manner at the time of the execution of fuel cut off processing.

The present disclosure adopts the following means in order to solve the above-mentioned problems. That is, the present disclosure resides in a control apparatus which is applied to an internal combustion engine which is provided with: a turbocharger having a turbine arranged in an exhaust passage of the internal combustion engine and a compressor arranged in an intake passage of the internal combustion engine; an exhaust gas purification catalyst arranged in the exhaust passage at a location downstream of the turbine of the turbocharger; a bypass passage for flowing exhaust gas from a first portion of the exhaust passage upstream of the turbine of the turbocharger to a second portion of the exhaust passage downstream of the turbine and upstream of the exhaust gas purification catalyst; and a waste gate valve having a valve body for opening and closing an outlet of the bypass passage by its rotary motion on a predetermined pivot axis, and an actuator for rotating the valve body. Here, note that the exhaust gas purification catalyst, the bypass passage and the waste gate valve are arranged in such a manner that when the degree of opening of the waste gate valve, which is an angle of rotation of the valve body of the waste gate valve from its fully closed state, is equal to or more than a predetermined degree of opening, an extension line of a closure surface, which is a surface of the valve body acting to close the outlet of the bypass passage, intersects an upstream side end face of the exhaust gas purification catalyst, whereas when the degree of opening of the valve body is less than the predetermined degree of opening, the extension line of the closure surface does not intersect the upstream side end face of the exhaust gas purification catalyst, but intersects a wall surface of the exhaust passage located at the upstream side of the upstream side end face. Then, the control apparatus is provided with a controller which is configured to obtain the temperature of the exhaust gas purification catalyst, and control the degree of opening of the valve body of the waste gate valve. At the time of the execution of fuel cut off processing, which is processing to stop the supply of fuel to the internal combustion engine in the course of the operation of the internal combustion engine, the controller obtains the temperature of the exhaust gas purification catalyst, and controls the waste gate valve in such a manner that when the temperature of the exhaust gas purification catalyst is less than a predetermined temperature, the valve body of the waste gate valve is made to be fully closed, whereas when the temperature of the exhaust gas purification catalyst is equal to or more than the predetermined temperature, the degree of opening of the valve body of the waste gate valve is made to be a deterioration suppression opening degree which is larger than when the valve body is fully closed and which is smaller than the predetermined degree of opening.

Here, note that the "predetermined temperature" referred to herein is, for example, a temperature at which it is considered to be desirable that the exhaust gas purification catalyst be cooled when the temperature of the exhaust gas purification catalyst is equal to or higher than the predetermined temperature. In addition, the statement "the extension line of the closure surface intersects the upstream side end face of the exhaust gas purification catalyst" referred to herein can also be rephrased as follows: there exists a line which intersects the upstream side end face of the exhaust gas purification catalyst on the same plane as the closure surface. Similarly, the statement "the extension line of the closure surface does not intersect the upstream side end face of the exhaust gas purification catalyst, but intersects a wall surface of the exhaust passage located at the upstream side of the upstream side end face" can be rephrased as follows: there does not exist any line intersecting the upstream side end face of the exhaust gas purification catalyst on the same plane as the closure surface, but there exists a line intersecting a wall surface of the exhaust passage located at the upstream side of the upstream side end face.

According to such an arrangement, when the temperature of the exhaust gas purification catalyst is less than the predetermined temperature at the time of the execution of the fuel cut off processing, the valve body of the waste gate valve will be fully closed. In that case, the entire exhaust gas will pass through the turbine, and will flow into the exhaust gas purification catalyst. Here, when the valve body of the waste gate valve is made to open at the time of the temperature of the exhaust gas purification catalyst being lower than the predetermined temperature and at the same time of the fuel cut off processing being carried out, a part of exhaust gas (air) of low temperature discharged from the internal combustion engine will flow into the exhaust gas purification catalyst by way of the bypass passage. Because the exhaust gas passing through the bypass passage is less susceptible to the heat of the turbine, it will flow into the exhaust gas purification catalyst in a low temperature state. As a result, there is a possibility that the exhaust gas purification catalyst is cooled unnecessarily. On the other hand, when the valve body of the waste gate valve is made to fully close at the time of the temperature of the exhaust gas purification catalyst being lower than the predetermined temperature and at the time of the fuel cut off processing being carried out, all the exhaust gas of low temperature discharged from the internal combustion engine will flow into the exhaust gas purification catalyst by way of the turbine. As a result, the exhaust gas warmed by receiving the heat of the turbine will flow into the exhaust gas purification catalyst, so that unnecessary cooling of the exhaust gas purification catalyst can be suppressed as much as possible.

On the other hand, when the temperature of the exhaust gas purification catalyst is equal to or more than the predetermined temperature and when the fuel cut off processing is carried out, it is desirable to cool the exhaust gas purification catalyst by the exhaust gas of low temperature which has not passed through the turbine. However, when the temperature of the exhaust gas purification catalyst is equal to or more than the predetermined temperature and at the same time the fuel cut off processing is carried out, the occurrence of thermal stress and the occurrence of sintering may be caused, as mentioned above, when the amount of exhaust gas impinging directly against the part of the upstream side end face of the exhaust gas purification catalyst (hereinafter, referred to as an "upstream side catalyst end face") among the exhaust gas of low temperature having not passed through the turbine becomes large. Accordingly, when the temperature of the exhaust gas purification catalyst is equal to or more than the predetermined temperature at the time of the execution of the fuel cut off processing, the control apparatus for an internal combustion engine of the present disclosure controls the degree of opening of the valve body of the waste gate valve to the deterioration suppression opening degree which is larger than when the valve body is fully closed (i.e., fully closed opening degree), but smaller than the predetermined degree of opening. Here, the exhaust gas flowing out from the outlet of the bypass passage at the time of opening of the valve body of the waste gate valve will flow along the closure surface of the valve body. In other words, the exhaust gas flowing out from the outlet of the bypass passage at the time of opening of the valve body of the waste gate valve will be guided by the closure surface so that it is directed to flow on the extension line of the closure surface. Accordingly, when the degree of opening of the valve body of the waste gate valve is controlled to the deterioration suppression opening degree, which is a degree of opening at which the extension line of the closure surface intersects a wall surface of the exhaust passage which is located at the upstream side of the upstream side catalyst end face (hereinafter, referred to an "upstream side passage wall surface"), the exhaust gas having flowed out from the outlet of the bypass passage will be directed to flow toward the upstream side passage wall surface. In that case, most of the exhaust gas of low temperature having flowed out from the outlet of the bypass passage will impinge against the upstream side passage wall surface, before impinging against the upstream side catalyst end face. Then, the exhaust gas having impinged against the upstream side passage wall surface diffuses in the exhaust passage, and thereafter arrives at the upstream side catalyst end face. Accordingly, the amount of the exhaust gas impinging directly against the part of the upstream side catalyst end face, among the exhaust gas of low temperature having not passed through the turbine, can be suppressed small. As a result, the part of the upstream side catalyst end face is suppressed from being rapidly cooled locally, or from becoming an atmosphere of excessive oxygen. With this, the exhaust gas purification catalyst can be cooled, while suppressing the occurrence of thermal stress and the occurrence of sintering as much as possible.

Here, note that when the exhaust gas having flowed out from the outlet of the bypass passage impinges against the upstream side passage wall surface, the heat of the upstream side passage wall surface may be transmitted to the exhaust gas and the temperature of the exhaust gas may go up, but the temperature of the upstream side passage wall surface is lower than the temperature of the turbine, and hence, it is considered that a sufficient cooling effect can be obtained, even if the exhaust gas after impinging against the upstream side passage wall surface flows into the exhaust gas purification catalyst. Rather, it is considered that the exhaust gas having flowed out from the outlet of the bypass passage receives the heat of the upstream side passage wall surface, and rises in temperature moderately, and hence a temperature difference between the exhaust gas and the exhaust gas purification catalyst is alleviated, thus providing a merit in the suppression of the occurrence of thermal stress in the exhaust gas purification catalyst.

However, when the degree of opening of the valve body of the waste gate valve is controlled to the deterioration suppression opening degree, the exhaust gas flowing out from the outlet of the bypass passage is directed to flow on the extension line of the closure surface of the valve body, but before the exhaust gas impinges against the upstream side passage wall surface, a part of the exhaust gas may diffuse to the side of the upstream side catalyst end face rather than to the extension line of the closure surface. In that case, a part of the exhaust gas having flowed out from the outlet of the bypass passage may impinge directly against the upstream side passage wall surface.

Accordingly, the deterioration suppression opening degree may be a degree of opening which is obtained by subtracting from the predetermined degree of opening a degree of opening corresponding to an extent to which the exhaust gas having flowed out from the outlet of the bypass passage at the time of the execution of the fuel cut off processing diffuses to the upstream side catalyst end face side with respect to the extension line of the closure surface. Thus, if the deterioration suppression opening degree is set in this manner, it is possible to make small the amount of the exhaust gas impinging directly against the upstream side catalyst end face, among the exhaust gas having flowed out from the outlet of the bypass passage, in a more reliable manner, when the temperature of the exhaust gas purification catalyst is equal to or more than the predetermined temperature and when the fuel cut off processing is carried out. As a result, the occurrence of thermal stress and the occurrence of sintering in the exhaust gas purification catalyst can be suppressed in a more reliable manner. Here, note that the degree of opening corresponding to an extent to which the exhaust gas having flowed out from the outlet of the bypass passage at the time of the execution of the fuel cut off processing diffuses to the upstream side catalyst end face side with respect to the extension line of the closure surface may have been obtained in advance by adaptation work making use of experiments, etc.

According to the present disclosure, the temperature of the exhaust gas purification catalyst can be adjusted in a suitable manner at the time of the execution of fuel cut off processing.

Further features of the present disclosure will become apparent from the following description of exemplary embodiments with reference to the attached drawings.

BRIEF DESCRIPTION OF THE DRAWINGS

FIG. 1 is a view showing the schematic construction of an internal combustion engine to which the present disclosure is applied.

FIG. 2 is a cross sectional view of a turbine housing.

FIG. 3 is a plan view of the turbine housing.

FIG. 4 is a view showing the flow of exhaust gas having passed through a bypass passage at the time of opening of a valve body of a waste gate valve.

FIG. 5 is a view showing a predetermined degree of opening A of the valve body of the waste gate valve.

FIG. 6 is a flow chart showing a processing routine for controlling the degree of opening of the valve body of the waste gate valve at the time of the execution of fuel cut off processing in a first embodiment of the present disclosure.

FIG. 7 is a view showing a deterioration suppression opening degree Dc of the valve body of the waste gate valve.

FIG. 8 is a view showing another method for setting the deterioration suppression opening degree Dc.

DETAILED DESCRIPTION

Hereinafter, specific embodiments of the present disclosure will be described based on the attached drawings. However, the dimensions, materials, shapes, relative arrangements and so on of component parts described in the embodiments are not intended to limit the technical scope of the present disclosure to these alone in particular as long as there are no specific statements.

Embodiment 1

Reference will be made to a first embodiment of the present disclosure based on FIGS. 1 through 7. FIG. 1 is a view showing the schematic construction of an internal combustion engine to which the present disclosure is applied. The internal combustion engine 1 shown in FIG. 1 is a compression ignition type internal combustion engine (diesel engine) or a spark ignition type internal combustion engine (gasoline engine).

The internal combustion engine 1 is connected to an intake pipe 3 through an intake manifold 2. In the middle of the intake pipe 3, there is arranged a throttle valve 30 which serves to adjust the channel cross section of the intake pipe 3. A compressor housing 51 of a turbocharger 5 is arranged in the intake pipe 3 at the upstream side of the throttle valve 30. An intercooler 31 is arranged in the intake pipe 3 at a location between the compressor housing 51 and the throttle valve 30.

In addition, the internal combustion engine 1 is connected to a turbine housing 50 of the turbocharger 5 through an exhaust manifold 4. The turbine housing 50 is connected to an exhaust pipe 7 through a catalyst casing 6. The catalyst casing 6 receives an exhaust gas purification (reduction) catalyst (e.g., a three-way catalyst, an oxidation catalyst, etc.) 60 for reducing at least one of hydrocarbon (HC), carbon monoxide (CO), and nitrogen oxides (NOx) contained in exhaust gas.

Here, the turbocharger 5 is constructed in such a manner that a turbine 50*a* rotatably received in the turbine housing 50 and a compressor 51*a* rotatably received in the compressor housing 51 are integrally connected with each other. The turbocharger 5 constructed in this manner compresses intake air by causing the compressor 51*a* to rotate with the use of the rotating force of the turbine 50*a* which is driven to rotate by means of exhaust gas energy. Here, note that the intake air, which has been compressed to become high in temperature by means of the compressor 51*a*, is cooled by heat exchange with outside air or cooling water in the intercooler 31.

Moreover, the turbine housing 50 is provided with a bypass passage 502 that serves to place a turbine inlet 500 for introducing the exhaust gas having flowed out from the exhaust manifold 4 to the turbine 50*a*, and a turbine outlet 501 for discharging the exhaust gas having passed through the turbine 50*a* toward the catalyst casing 6 in communication with each other, as shown in FIGS. 2 and 3. Further, the turbine housing 50 is provided with a waste gate valve 503 for opening and closing an open end (i.e., outlet) of the bypass passage 502 at the side of the turbine outlet 501.

The waste gate valve 503 is provided with a plate-shaped valve body 503*a* having an outside diameter larger than the outlet of the bypass passage 502, a drive shaft 503*c* arranged so as to be at right angles with respect to the axis of the outlet of the bypass passage 502, a swing arm 503*b* connecting the valve body 503*a* and the drive shaft 503*c* with each other, and an actuator 503*d* for causing the drive shaft 503*c* to rotate in a circumferential direction. The actuator 503*d* is, for example, an actuator which is able to change the angle of rotation of the drive shaft 503*c*, and is operated by using electricity or pressure as a driving source. According to the waste gate valve 503 constructed in this manner, the actuator 503*d* causes the drive shaft 503*c* to rotate, whereby the valve body 503*a* and the swing arm 503*b* are driven to rotate or pivot on the drive shaft 503*c* as a pivot axis.

Here, note that when the valve body 503*a* of the waste gate valve 503 is in a fully closed state, a closure surface 530 of the valve body 503*a* (i.e., a surface which closes the outlet of the bypass passage 502) and an outlet side opening surface of the bypass passage 502 are placed into intimate contact with each other in a parallel state, whereby the conduction of the bypass passage 502 is interrupted, as shown by a solid line in FIG. 2. In that case, all the exhaust gas having flowed into the turbine inlet 500 from the exhaust manifold 4 passes through the turbine 50*a*, and flows into the turbine outlet 501. In addition, when the actuator 503*d* causes the drive shaft 503*c* to rotate in a state where the valve body 503*a* of the waste gate valve 503 is in the fully closed state, the valve body 503*a* and the swing arm 503*b* are driven to rotate or pivot about the drive shaft 503*c*, so that the closure surface 530 of the valve body 503*a* is separated from the outlet side opening surface of the bypass passage 502, while being inclined with respect to the outlet side opening surface of the bypass passage 502, as shown by an alternate long and short dash line in FIG. 2. As a result, the outlet of the bypass passage 502 is opened, and the bypass passage 502 becomes a conductive state. In that case, a part of the exhaust gas having flowed into the turbine inlet 500 from the exhaust manifold 4 flows through the bypass passage 502 and arrives at the turbine outlet 501, while bypassing the turbine 50*a*. The flow rate of the exhaust gas passing through the bypass passage 502 at that time can also be adjusted by changing the degree of opening of the valve body 503*a* of the waste gate valve 503 (a pivot or rotation angle of the valve body 503*a* from the fully closed state (i.e., an angle of rotation of the drive shaft 503*c* from the fully closed state)).

Here, returning to FIG. 1, in the internal combustion engine 1 constructed as mentioned above, there is arranged in combination therewith an ECU (Electronic Control Unit) 8 which acts as a controller according to the present disclosure. The ECU 8 is composed of a CPU, a ROM, a RAM, a backup RAM, and so on. The ECU 8 is electrically connected to a variety of kinds of sensors such as an accelerator position sensor 9, a crank position sensor 10, an intake air pressure sensor 11, an air flow meter 32, an exhaust gas temperature sensor 70, and so on. The accelerator position sensor 9 outputs an electrical signal correlated with an amount of operation of an accelerator pedal (i.e., a degree of opening of an accelerator). The crank position sensor 10 outputs an electrical signal correlated with the rotational position of an unillustrated crankshaft of the internal combustion engine 1. The intake air pressure sensor 11 is mounted on the intake manifold 2, and outputs an electrical signal correlated with an intake air pressure (a supercharging pressure) in the intake manifold 2. An air flow meter 32 is mounted on the intake pipe 3 at a location upstream of the compressor housing 51, and outputs an electrical signal correlated with the mass of the intake air flowing through the interior of the intake pipe 3. The exhaust gas temperature sensor 70 is mounted on the exhaust pipe 7 in the vicinity of the catalyst casing 6, and outputs an electrical signal correlated with the temperature of the exhaust gas flowing out from the catalyst casing 6.

The ECU 8 is electrically connected to a variety of kinds of equipment, such as the throttle valve 30, the actuator 503*d* of the waste gate valve 503, fuel injection valves of the internal combustion engine 1, etc., as mentioned above, and controls those various kinds of equipment based on the output signals of the above-mentioned various kinds of sensors. For example, when the supply of fuel to the internal combustion engine 1 is carried out (i.e., when fuel is combusted in the internal combustion engine 1), the ECU 8 calculates a target supercharging pressure by using, as parameters, an engine rotational speed calculated based on the output signal of the crank position sensor 10, and the output signal of the accelerator position sensor 9 (the accelerator opening degree). Then, when the supercharging pressure detected by the intake air pressure sensor 11 is equal to or less than the target supercharging pressure, the ECU 8 causes the valve body 503*a* of the waste gate valve 503 to be fully closed, whereas when the supercharging pressure detected by the intake air pressure sensor 11 is higher than the target supercharging pressure, the ECU 8 causes the valve body 503*a* of the waste gate valve 503 to be opened. In that case, the ECU 8 may adjust the flow rate of the exhaust gas flowing through the bypass passage 502, by changing the degree of opening of the valve body 503*a* of the waste gate valve 503 according to a difference between the supercharging pressure detected by the intake air pressure sensor 11 and the target supercharging pressure.

Here, note that, as shown in FIGS. 2 and 3, according to the waste gate valve 503 provided with the valve body 503*a* of a rotary type (i.e., a swing arm type), the exhaust gas flowing out from the outlet of the bypass passage 502 at the time of opening of the valve body 503*a* of the waste gate valve 503 will flow along the closure surface 530 of the valve body 503*a*, as shown by an arrow Y in FIG. 4. In other words, the exhaust gas flowing out from the outlet of the bypass passage 502 is guided by the closure surface 530 so as to be directed to flow on the extension line of the closure surface 530 of the valve body 503a. Accordingly, the direction of movement (i.e., the direction to be directed) of the exhaust gas flowing out from the bypass passage 502 can be changed, by changing the degree of opening of the valve body 503a of the waste gate valve 503.

Accordingly, in this embodiment, the bypass passage 502, the waste gate valve 503 and an exhaust gas purification catalyst 60 are arranged in such a manner that when the degree of opening of the valve body 503a of the waste gate valve 503 is equal to or more than a predetermined degree of opening (i.e., a degree of opening A in FIG. 5), the extension line of the closure surface 530 of the valve body 503a intersects an upstream side end face (i.e., an upstream side catalyst end face) 60a of the exhaust gas purification catalyst 60, whereas when the degree of opening of the valve body 503a of the waste gate valve 503 is less than the predetermined degree of opening A, the extension line of the closure surface 530 of the valve body 503a does not intersect the upstream side catalyst end face 60a, but intersects a wall surface (an upstream side passage wall surface) 6a of the exhaust passage located at the upstream side of the upstream side catalyst end face 60a, as shown in FIG. 5. The upstream side passage wall surface 6a referred to herein is an inner wall surface of the catalyst casing 6 located at the upstream side of the upstream side catalyst end face 60a, or an inner wall surface of the turbine outlet 501.

In the arrangement as mentioned above, in the case where the temperature of the exhaust gas purification catalyst 60 is lower than a temperature at which the purifying or reducing ability of the exhaust gas purification catalyst 60 is activated (hereinafter referred to as an "activation temperature"), as in the case where the internal combustion engine 1 is cold started, when the supply of fuel to the internal combustion engine 1 is carried out, the ECU 8 gives priority to the early activation of the exhaust gas purification catalyst 60 over making the supercharging pressure to the target supercharging pressure. That is, when the temperature of the exhaust gas purification catalyst 60 is lower than the activation temperature, even if the supercharging pressure detected by the intake air pressure sensor 11 is equal to or less than the target supercharging pressure, the ECU 8 controls the actuator 503d in such a manner that the degree of opening of the valve body 503a of the waste gate valve 503 becomes equal to or more than the predetermined degree of opening A. Here, when the valve body 503a of the waste gate valve 503 is fully closed during the time the supply of fuel to the internal combustion engine 1 is carried out, the exhaust gas of high temperature discharged from the internal combustion engine 1 passes through the turbine 50a, so that the heat energy possessed by the exhaust gas is consumed as a driving source of the turbine 50a. As a result, the temperature of the exhaust gas at the time of flowing into the exhaust gas purification catalyst 60 becomes low. In contrast to this, when the valve body 503a of the waste gate valve 503 is opened during the time the supply of fuel to the internal combustion engine 1 is carried out, a part of the exhaust gas of high temperature discharged from the internal combustion engine 1 passes through the bypass passage 502, so that the heat energy possessed by the exhaust gas is not consumed as a driving source of the turbine 50a. As a result, the temperature of the exhaust gas at the time of flowing into the exhaust gas purification catalyst 60 becomes high. Moreover, when the degree of opening of the valve body 503a of the waste gate valve 503 at that time is made equal to or larger than the predetermined degree of opening A, most of the exhaust gas of high temperature having passed through the bypass passage 502 impinges directly against the upstream side catalyst end face 60a, so that the temperature of the exhaust gas at the time of flowing into the exhaust gas purification catalyst 60 can be made higher.

In addition, in this embodiment, when processing to stop the supply of fuel to the internal combustion engine 1 (fuel cut off processing) is carried out, as at the time of a deceleration operation of the internal combustion engine 1 in which the engine rotation speed is made equal to or more than a predetermined rotation speed and in which the accelerator opening degree is made to zero, the ECU 8 controls the degree of opening of the valve body 503a of the waste gate valve 503 so as to give priority to the temperature control of the exhaust gas purification catalyst 60 in comparison with the adjustment of the supercharging pressure. Hereinafter, a method of controlling the degree of opening of the valve body 503a of the waste gate valve 503 at the time of the execution of the fuel cut off processing the time will be explained along FIG. 6.

FIG. 6 is a flow chart showing a processing routine which is carried out by the ECU 8 for controlling the degree of opening of the valve body 503a of the waste gate valve 503 at the time of the execution of the fuel cut off processing. The processing routine shown in FIG. 6 is carried out by the ECU 8 in a predetermined period in a repeated manner, and has been stored in advance in the ROM of the ECU 8, etc.

In the processing routine of FIG. 6, first in the processing of step S101, the ECU 8 determines whether the fuel cut off processing is being carried out. For example, a fuel cut off processing flag, which is set to "1" when the fuel cut off processing is started and which is reset to "0" at the time of the end of the fuel cut off processing, may have been set or stored in the RAM of the ECU 8, etc., and a determination as to whether the fuel cut off processing is being carried out may be made by means of the ECU 8 by referring to the fuel cut off processing flag. In cases where an affirmative determination is made in the processing of step S101, the routine of the ECU 8 goes to the processing of step S102.

In the processing of step S102, the ECU 8 obtains a temperature Tcat of the exhaust gas purification catalyst 60. For example, the ECU 8 may estimate the temperature Tcat of the exhaust gas purification catalyst 60 from an output value of the exhaust gas temperature sensor 70, or may estimate the temperature Tcat of the exhaust gas purification catalyst 60 from an operating state of the internal combustion engine 1. In addition, in cases where a temperature sensor is mounted on the exhaust passage at a location upstream of the exhaust gas purification catalyst 60, the ECU 8 may estimate the temperature Tcat of the exhaust gas purification catalyst 60 based on a difference between an output value of that temperature sensor, and the output value of the exhaust gas temperature sensor 70.

In the processing of step S103, the ECU 8 determines whether the temperature Tcat of the exhaust gas purification catalyst 60 obtained in the processing of step S102 is less than a predetermined temperature Tpre. The predetermined temperature Tpre referred to herein is a temperature at which it is considered to be desirable that the exhaust gas purification catalyst 60 be cooled when the temperature Tcat of the exhaust gas purification catalyst 60 is equal to or higher than that predetermined temperature Tpre, and which is sufficiently higher than the activation temperature of the exhaust gas purification catalyst 60.

In cases where an affirmative determination is made in the processing of step S103 (Tcat<Tpre), it is desirable that unnecessary cooling of the exhaust gas purification catalyst 60 be suppressed. Here, at the time of the execution of the fuel cut off processing, the air sucked into the internal combustion engine 1 is discharged from the internal combustion engine 1, without being supplied for combustion. At that time, when the valve body 503a of the waste gate valve 503 is in an open state, a part of exhaust gas (air) of low temperature discharged from the internal combustion engine 1 flows into the exhaust gas purification catalyst 60 by way of the bypass passage 502. Because the exhaust gas passing through the bypass passage 502 is less susceptible to the heat of the turbine 50a in comparison with the exhaust gas passing through the turbine 50a, the temperature of the exhaust gas passing through the bypass passage 502 at the time of flowing into the exhaust gas purification catalyst 60 becomes low. Thus, when the valve body 503a of the waste gate valve 503 is made to open at the time of the temperature of the exhaust gas purification catalyst 60 being low and at the time of the fuel cut off processing being carried out, the exhaust gas purification catalyst 60 may be unnecessarily cooled by the exhaust gas of low temperature having passed through the bypass passage 502. Accordingly, in cases where an affirmative determination is made in the processing of step S103, the ECU 8 goes to the processing of S104, and controls the actuator 503d so that the degree of opening Dwgv of the valve body 503a of the waste gate valve 503 becomes zero. That is, the ECU 8 causes the valve body 503a of the waste gate valve 503 to be fully closed. In that case, all the exhaust gas discharged from the internal combustion engine 1 will flow into the exhaust gas purification catalyst 60 by way of the turbine 50a. Because the exhaust gas passing through the turbine 50a is warmed by the heat of the turbine 50a, the temperature of the exhaust gas at the time of flowing into the exhaust gas purification catalyst 60 becomes relatively high. As a result, it is possible to suppress the exhaust gas purification catalyst 60 from being cooled unnecessarily as much as possible.

On the other hand, in cases where a negative determination is made in the processing of step S103 (Tcat≥Tpre), it is desirable to cool the exhaust gas purification catalyst 60 by the exhaust gas which does not pass through the turbine 50a (i.e., the exhaust gas passing through the bypass passage 502). For that reason, in cases where a negative determination is made in the processing of step S103, it is desirable to open the valve body 503a of the waste gate valve 503. However, the exhaust gas flowing out from the outlet of the bypass passage 502 at the time of the valve body 503a of the waste gate valve 503 being opened is directed to flow on the extension line of the closure surface 530 of the valve body 503a, as described in the above-mentioned explanation of FIG. 4. For that reason, in cases where a negative determination is made in the processing of step S103, when the degree of opening Dwgv of the valve body 503a of the waste gate valve 503 is made equal to or larger than the predetermined degree of opening A, most of the exhaust gas of low temperature having passed through the bypass passage 502 comes to impinge directly against the upstream side catalyst end face 60a. At that time, when an amount of exhaust gas impinging directly against a part of the upstream side catalyst end face 60a, among the exhaust gas of low temperature having passed through the bypass passage 502, becomes large, the part of the upstream side catalyst end face 60a is cooled locally, so that thermal stress may act on the exhaust gas purification catalyst 60. In addition, the exhaust gas discharged from the internal combustion engine 1 at the time of the execution of the fuel cut off processing is air which is not used for combustion as mentioned above, and hence, when most of the exhaust gas impinges against the part of the upstream side catalyst end face 60a, that part may become an atmosphere with locally excessive oxygen, thus giving rise to a possibility that sintering of a precious metal catalyst may be caused. Accordingly, in cases where a negative determination is made in the processing of step S103, the routine of the ECU 8 goes to the processing of step S105, where the ECU 8 controls the actuator 503d in such a manner that the degree of opening Dwgv of the valve body 503a of the waste gate valve 503 becomes a deterioration suppression opening degree Dc. The deterioration suppression opening degree Dc referred to herein is smaller than the predetermined degree of opening A and larger than a fully closed opening degree, as shown in FIG. 7. When the degree of opening Dwgv of the valve body 503a of the waste gate valve 503 is made equal to the deterioration suppression opening degree Dc, the extension line of the closure surface 530 will intersect the upstream side passage wall surface 6a, so that the exhaust gas flowing out from the outlet of the bypass passage 502 will be directed to flow toward the upstream side passage wall surface 6a. As a result, most of the exhaust gas having flowed out from the outlet of the bypass passage 502 will impinge against the upstream side passage wall surface 6a, before impinging against the upstream side catalyst end face 60a. Then, the exhaust gas having impinged against the upstream side passage wall surface 6a will diffuse in the exhaust passage at the upstream side of the upstream side catalyst end face 60a, and thereafter will impinge against the upstream side catalyst end face 60a. Accordingly, the amount of the exhaust gas impinging directly against the part of the upstream side catalyst end face 60a becomes small, as a result of which the part of the upstream side catalyst end face 60a is suppressed from being rapidly cooled locally, or from becoming an atmosphere of excessive oxygen. This can suppress the deterioration of the exhaust gas purification catalyst 60 resulting from the occurrence of thermal stress or the occurrence of sintering as much as possible. In addition, when the exhaust gas having flowed out from the outlet of the bypass passage 502 impinges against the upstream side passage wall surface 6a, the exhaust gas receives the heat of the upstream side passage wall surface 6a, and rises in temperature moderately, so that a temperature difference between the exhaust gas at the time of impinging against the upstream side catalyst end face 60a and the exhaust gas purification catalyst 60 is alleviated, thus making it possible to suppress the occurrence of thermal stress in a more reliable manner.

Here, depending on the layout of an exhaust system including the catalyst casing 6, the bypass passage 502 and the waste gate valve 503, the extension line of the closure surface 530 may intersect the upstream side passage wall surface (an upstream side passage wall surface located at an upper side in FIG. 7), when the valve body 503a of the waste gate valve 503 is made to open to a degree of opening which is larger than the predetermined degree of opening A, and which is larger than a range of the degree of opening in which the extension line of the closure surface 530 intersects the upstream side catalyst end face 60a. However, at such a degree of opening, most of the exhaust gas having flowed out from the outlet of the bypass passage 502 is not directed on the extension line of the closure surface 530. For that reason, an amount of the exhaust gas impinging directly against the upstream side catalyst end face 60a, among the exhaust gas having flowed out from the outlet of the bypass passage 502, may become large. Accordingly, the deterioration suppression opening degree Dc is set in a range of the degree of opening which is smaller than the predetermined degree of opening A.

Moreover, the exhaust gas flowing out from the outlet of the bypass passage 502 is guided by the closure surface 530 so as to be directed to flow on the extension line of the closure surface 530 of the valve body 503a, as mentioned above, but before reaching the upstream side passage wall surface 6a, the exhaust gas may diffuse to the side of the upstream side catalyst end face 60a (i.e., a downstream side in FIG. 7) rather than to the extension line of the closure surface 530. In addition, when taking the point of view of enhancing the cooling efficiency of the exhaust gas purification catalyst 60, it is desirable to make the flow rate of the exhaust gas passing through the bypass passage 502 as high as possible. Accordingly, the deterioration suppression opening degree Dc may be set to a degree of opening which is obtained by subtracting from the predetermined degree of opening A a degree of opening corresponding to an extent to which the exhaust gas (an arrow Y' in FIG. 8) having flowed out from the outlet of the bypass passage 502 at the time of the execution of the fuel cut off processing diffuses to the side of the upstream side catalyst end face 60a with respect to the extension line of the closure surface 530 (e.g., a spread angle (B in FIG. 8) of the exhaust gas on the extension line of the closure surface 530), as shown in FIG. 8. Thus, if the deterioration suppression opening degree Dc is set in this manner, when the temperature Tcat of the exhaust gas purification catalyst 60 is equal to or more than the predetermined temperature Tpre and when the fuel cut off processing is carried out, it is possible to ensure the flow rate of the exhaust gas passing through the bypass passage 502 as high as possible, while suppressing small the amount of the exhaust gas impinging directly against the upstream side catalyst end face 60a, among the exhaust gas having flowed out from the outlet of the bypass passage 502, in a more reliable manner. As a result, it becomes possible to cool the exhaust gas purification catalyst 60 in an efficient manner, while suppressing the occurrence of thermal stress and the occurrence of sintering in the exhaust gas purification catalyst 60 in a more reliable manner.

Here, returning to the processing routine of FIG. 6, in cases where a negative determination is made in the processing of step S101, the routine of the ECU 8 goes to the processing of step S106, where the ECU 8 controls the actuator 503d in such a manner that the degree of opening Dwgv of the valve body 503a of the waste gate valve 503 becomes a normal opening degree. The normal opening degree referred to herein is a degree of opening which is set to zero (i.e., fully closed opening degree), when the supercharging pressure detected by the intake air pressure sensor 11 is equal to or less than the target supercharging pressure, and which is set to be larger than zero, when the supercharging pressure detected by the intake air pressure sensor 11 is higher than the target supercharging pressure (e.g., a degree of opening which is made larger, as the difference between the supercharging pressure detected by the intake air pressure sensor 11 and the target supercharging pressure becomes larger). However, even if the supercharging pressure detected by the intake air pressure sensor 11 is equal to or less than the target supercharging pressure, in cases where the temperature Tcat of the exhaust gas purification catalyst 60 is lower than the activation temperature thereof, the normal opening degree is set to a degree of opening which is equal to or larger than the predetermined degree of opening A, and at which most of the exhaust gas having flowed out from the outlet of the bypass passage 502 impinges directly against the upstream side catalyst end face 60a.

As described above, the ECU 8 controls the degree of opening Dwgv of the valve body 503a of the waste gate valve 503 according to the processing routine of FIG. 6, whereby at the time of the execution of the fuel cut off processing, the temperature of the exhaust gas purification catalyst 60 can be adjusted, while suppressing the deterioration of the exhaust gas purification catalyst 60.

Embodiment 2

In the above-mentioned first embodiment, the above-mentioned processing routine of FIG. 6 is carried out in a repeated manner during the execution of the fuel cut off processing, and hence, in cases where the temperature of the exhaust gas purification catalyst 60 has changed from a temperature less than the predetermined temperature Tpre to a temperature more than the predetermined temperature Tpre, or from a temperature more than the predetermined temperature Tpre to a temperature less than the predetermined temperature Tpre, in the course of the execution of the fuel cut off processing, the degree of opening Dwgv of the valve body 503a of the waste gate valve 503 will be changed. In contrast to this, the degree of opening Dwgv of the valve body 503a of the waste gate valve 503 during the fuel cut off processing execution may be fixed to a degree of opening corresponding to the temperature Tcat of the exhaust gas purification catalyst 60 at the time of the start of the fuel cut off processing. That is, when the temperature Tcat of the exhaust gas purification catalyst 60 at the time of the start of the fuel cut off processing is less than the predetermined temperature Tpre (Tcat<Tpre), the ECU 8 fixes the degree of opening Dwgv of the valve body 503a of the waste gate valve 503 during the period of the execution of the fuel cut off processing to zero (fully closed opening degree). On the other hand, when the temperature Tcat of the exhaust gas purification catalyst 60 at the time of the start of the fuel cut off processing is equal to or more than the predetermined temperature Tpre (Tcat≥Tpre), the ECU 8 fixes the degree of opening Dwgv of the valve body 503a of the waste gate valve 503 during the period of the execution of the fuel cut off processing to the deterioration suppression opening degree Dc. According to such a method, the temperature of the exhaust gas purification catalyst 60 can be adjusted simply, while suppressing the deterioration of the exhaust gas purification catalyst 60 at the time of the execution of the fuel cut off processing.

Other Embodiment

In the above-mentioned first and second embodiments, there has been described an example in which when the temperature Tcat of the exhaust gas purification catalyst 60 at the time of the fuel cut off processing being carried out is less than the predetermined temperature Tpre, the valve body 503a of the waste gate valve 503 is fully closed. In contrast to this, in cases where the temperature Tcat of the exhaust gas purification catalyst 60 at the time of the execution of the fuel cut off processing is less than the predetermined temperature Tpre, when the operating state of the internal combustion engine 1 is not in a surge region of the turbocharger 5, the valve body 503a of the waste gate valve 503 may be fully closed, whereas when the operating state of the internal combustion engine 1 is in the surge region of the turbocharger 5, the valve body 503a of the waste gate valve 503 may be opened at as small a degree of opening as possible. According to such a method, the surge of the turbocharger 5 can be suppressed, while suppressing unnecessary cooling of the exhaust gas purification catalyst 60 to a minimum.

While the present disclosure has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-228827, filed on Nov. 24, 2015, which is hereby incorporated by reference herein in its entirety.

What is claimed is:

1. A control apparatus for an internal combustion engine, the internal combustion engine includes a turbocharger having a turbine arranged in an exhaust passage of the internal combustion engine and a compressor arranged in an intake passage of the internal combustion engine; an exhaust gas purification catalyst arranged in the exhaust passage at a location downstream of the turbine of the turbocharger; a bypass passage for flowing exhaust gas from a first portion of the exhaust passage upstream of the turbine of the turbocharger to a second portion of the exhaust passage downstream of the turbine and upstream of the exhaust gas purification catalyst; and a waste gate valve having a valve body for opening and closing an outlet of the bypass passage by its rotary motion on a predetermined pivot axis, and an actuator for rotating the valve body, wherein the exhaust gas purification catalyst, the bypass passage and the waste gate valve are arranged in such a manner that when a degree of opening of the waste gate valve, which is an angle of rotation of the valve body of the waste gate valve from its fully closed state, is equal to or more than a predetermined degree of opening, an extension line of a closure surface of the valve body of the waste gate valve, which is a surface of the valve body acting to close the outlet of the bypass passage, intersects an upstream side end face of the exhaust gas purification catalyst, whereas when the degree of opening of the waste gate valve is less than the predetermined degree of opening of the waste gate valve, the extension line of the closure surface of the valve body of the waste gate valve does not intersect the upstream side end face of the exhaust gas purification catalyst, but intersects a wall surface of the exhaust passage located at the upstream side of the upstream side end face of the exhaust gas purification catalyst, the control apparatus comprising a controller configure to:

obtain a temperature of the exhaust gas purification catalyst; and control the degree of opening of the valve body of the waste gate valve, wherein, the controller is programmed to, at a time of execution of fuel cut off processing, which is processing to stop supply of fuel to the internal combustion engine in a course of operation of the internal combustion engine, obtain the temperature of the exhaust gas purification catalyst; and control the waste gate valve in such a manner that when the temperature of the exhaust gas purification catalyst is less than a predetermined temperature, the valve body of the waste gate valve is made to be fully closed, whereas when the temperature of the exhaust gas purification catalyst is equal to or more than the predetermined temperature, the degree of opening of the valve body of the waste gate valve is made to be a deterioration suppression opening degree which is larger than when the valve body is fully closed and smaller than the predetermined degree of opening of the waste gate valve to suppress the deterioration of the exhaust gas purification catalyst.

2. The control apparatus for an internal combustion engine as set forth in claim 1, wherein the deterioration suppression opening degree is a degree of opening which is obtained by subtracting a degree of opening, which corresponds to an angle at which the extension line of the closure surface allows the exhaust gas to diffuse from the outlet of the bypass passage to an upstream end face of the exhaust gas purification catalyst, from the predetermined degree of opening of the waste gate valve, at the time of the execution of the fuel cut off processing.

* * * * *